United States Patent Office 3,341,501
Patented Sept. 12, 1967

3,341,501
POLYAMIDES CONTAINING SILANE END GROUPS
Ross M. Hedrick and William R. Richard, Jr., St. Louis, Mo., assignors to Monsanto Company, a corporation of Delaware
No Drawing. Filed May 31, 1963, Ser. No. 284,344
13 Claims. (Cl. 260—78)

This invention relates to a process for the preparation of linear polyamides containing silane end groups on at least part of the polymer chains, and to the novel polymers obtained by this process.

Various organosilicon compositions have been employed to modify synthetic and natural resins; however, many difficulties are encountered when attempts are made to incorporate organosilicon linkages into polyamides. Many of the organosilicon compounds are totally unsatisfactory for this particular application, and others give poor physical properties to the product polymer.

The present invention pertains to novel compositions containing silane groups chemically bonded to linear polyamides. In one aspect of this invention, the organosilicon compound is chemically bound to polymeric chains through amide linkages. The chemical combination of organosilicon compound with polyamide results in polymeric materials having improved properties when compared with the corresponding polyamide which omits the organosilicon constituent.

It is an object of this invention to produce polyamides which have improved physical properties. It is another object of this invention to provide polyamide compositions which can be bonded to metal or glass with a tenacity that withstands boiling water.

It is a further object of this invention to provide polyamide compositions that inherently contain a coupling agent. Reinforced polyamides having greatly improved toughness, modulus and impact strength can be prepared by utilizing the coupling activity of organosilicon compounds to bind the polyamide chains to comparatively inert materials.

It is yet another object of this invention to provide a process for the polymerization of cyclic amides wherein an amino-functional silane is used as a molecular weight regulator during the polymerization step to prepare linear polyamides containing silane end groups.

In the practice of this invention lactams having from 3 to 15 or more carbon atoms in the lactam ring can be employed. Suitable lactams include 4,4-dimethylazetidinone, β-pyrrolidone, piperidone, morpholone, γ-valerolactam, caprolactam. The terminology of lactams is not consistent in the chemical literature, as these compounds are sometimes named as derivatives of the ring system formed by the intramolecular condensation of amino carboxylic acids, and also named simply as the lactam of an amino acid. Thus ε-caprolactam can be named aminocaproic lactam. Other suitable lactams include aminocaprylic lactam, aminocapric lactam, aminolauric lactam, aminononanoic lactam, aminotridecanoic lactam and aminomyristic lactam. Preferred lactams that can be used in the instant process are characterized by the formula

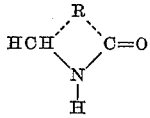

wherein R is a divalent alkylene bridge group, of 1 to 13 carbon atoms, necessary to complete the heterocyclic ring system. Preferably, R is an alkylene radical of 4 to 6 carbon atoms.

A particularly suitable lactam for the preparation of the linear polyamides is ε-caprolactam, commonly referred to as caprolactam.

The organosilicon compounds that are of particular interest in the practice of this invention can be classified as polyfunctional compounds. An essential portion of these materials is a hydrolyzable function that is readily converted, in the presence of water, to a silane of the formula $(HO)_x Si-$, wherein $x$ is an integer from 1 to 3. Alkoxy silanes and halo silanes, wherein halo represents chloro-, bromo-, or iodo-, fulfill this functional requirement. Another functional group of the organosilicon compound is incorporated into the polyamide chain during the polymerization reaction, and thus its chemical structure is limited to those groups which can participate in the base-catalyzed polymerization as herein defined. Suitable groups include the primary amino group, secondary amino group, hydroxyl, ester, mono-substituted amido group, urea, urethane, isocyanate, imide, epoxy, and precursor groups that can be converted to these during or prior to the polymerization reaction.

One group of organosilicon compounds that can be incorporated into the instant polymerization process includes the silanes having the general formula

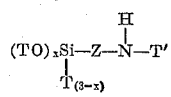

wherein T is an alkyl radical of 1 to 8 carbon atoms and each T radical can be the same or different, $x$ is an integer from 2 to 3, T' is hydrogen or an alkyl radical of 1 to 8 carbon atoms, and Z is a bivalent hydrocarbon radical selected from alkylene radicals of 2 to 9 carbon atoms and preferably from 3 to 6 carbon atoms and phenylene radicals. Optimum effects are obtained when the organosilicon compound has the formula

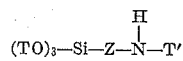

wherein T, T' and Z are as defined above.

It has been established that an amino group in a gamma or delta position relative to silicon in an organosilane undergoes the classic reactions of an amine. This is in contrast to situations where the amino group is attached to the alpha or beta carbon atom which results in an unstable molecule. Thus, representative organosilanes include, for example, aminopropyltriethoxysilane,
$(C_2H_5O)_3SiCH_2CH_2CH_2HN_2$,
aminobutyltrimethoxysilane,
aminopentyltripropoxysilane,
methylaminohexyltriethoxysilane,
aminobutylmethyldiethoxysilane,
$(C_2H_5O)_2Si(CH_3)C_4H_9NH_2$,
ethylaminophenyltrimethoxysilane,
methylaminophenylmethyldimethoxysilane, and
aminophenyltriethoxysilane.

Another group of polyfunctional organosilicon compounds useful in the practice of the present invention is the hydroxyalkylalkoxysilanes of the formula

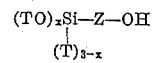

wherein T, $x$ and Z are described above. Preferably, the hydroxyalkylalkoxysilanes have the formula

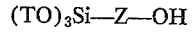

wherein T is an alkyl radical of 1 to 8 carbon atoms and Z is a bivalent hydrocarbon radical selected from alkylene radicals of 3 to 6 carbon atoms and phenylene radicals. Representative compounds include hydroxyethyltributoxysilane, hydroxypropyltrimethoxysilane, hydroxybutyltriethoxysilane, hydroxypentyltripropoxysilane and hydroxyphenyltriethoxysilane.

Other suitable polyfunctional organosilicon compounds include the compounds having a halosilane group and a ester group in the molecule. These compounds have the general formula

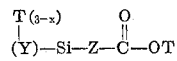

wherein Y is a halogen selected from chlorine, bromine and iodine, and $x$, Z and T are as defined above. Representative useful reactants include methoxycarbonylpropyltrichlorosilane, $CH_3OOCC_3H_6SiCl_3$, methoxycarbonylisopropyltrichlorosilane, $CH_3OOCCH(CH_3)CH_2SiCl_3$, ethoxycarbonylbutyltribromosilane, $C_2H_5OOCC_4H_8SiBr_3$, and ethoxycarbonylisobutyltrichlorosilane, $$C_2H_5OOCCH_2CH(CH_3)CH_2SiCl_3$$

It will be understood that various combinations of functional groups can be employed in the organosilicon compound so that, for example, an ester group and a siloxy group can be used in place of an ester group with a trihalosilane radical. Thus other suitable compounds can have the general formula

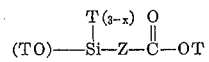

wherein $x$, T and Z are as previously defined.

A suitable functional group that can be employed in place of the ester group is the monosubstituted amido radical to give compounds having the formula

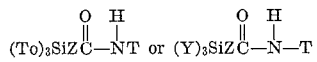

Compounds having functional groups according to these formulas include N-methylcarbamoylpropyltrimethoxysilane, $CH_3NHCOC_3H_6Si(OCH_3)_3$, N-phenylcarbamoylisopropyltriethoxysilane, $$C_6H_5NHCOCH(CH_3)CH_2Si(OC_2H_5)_3$$

N-ethylcarbamoylbutyltrichlorosilane, $$C_2H_5NHCOC_4H_8SiCl_3$$

and N-propylcarbamoylpropyltribromosilane, $$C_3H_7NHCOC_3H_6SiBr_3$$

Another group of suitable organosilicon compounds contain an isocyanato radical, O:C:N- and can be represented by the general formulas $$(TO)_3SiZ-NCO \text{ and } (Y)_3SiZ-NCO$$

wherein T, Z and Y are as defined above. Representative compounds included are 3-isocyanatopropyltrimethoxysilane, $OCNC_3H_6Si(OCH_3)_3$, 4-isocyanatobutyltrichlorosilane, $OCNC_4H_8SiCl_3$, and 5-isocyanatopentyltriethoxysilane, $OCNC_5H_{10}Si(OC_2H_5)_3$.

The functional group of the organosilicon molecule which is chemically bound into the polymer chain can be a group that is convertible to an acceptable radical prior to or during the polymerization, thus the epoxides and imides containing a radical corresponding to $(TO)_3SiZ-$ or $(Y)_3SiZ-$ can also be used.

The polymerization system in which the present invention is carried out is the base-catalyzed polymerization, as distinguished from the hydrolytic polymerization system. The reaction occurs through ionization of the lactam molecule to form an iminium ion. An iminium ion is understood to be that portion of a lactam molecule formed by removal of the hydrogen attached to the nitrogen of the lactam ring. Thus, the terminology "base-catalyzed polymerization of lactams" refers to polymerization involving the iminium ion and carried out under conditions in which said iminium ions are stable.

Suitable catalysts for the base-catalyzed polymerization of lactams according to this invention are any of the metals (which can be in metallic, complex ion, or compound form) which are capable of forming acids (in the "Lewis acid" sense) sufficiently strong to form an iminium salt of the lactam being polymerized. This iminium salt is then the active catalysts of the present base-catalyzed polymerization system. Common examples of such catalysts are the alkali and alkaline earth metals, e.g., sodium, potassium, lithium, calcium, strontium, barium, magnesium, etc., either in metallic form or in the form of hydrides, borohydrides, oxides, hydroxides, carbonates, etc. In the case of compounds such as the hydroxides and carbonates, which give off water when reacted with lactams, the bulk of such water must be removed from the polymerization system, for example, by the application of heat and/or reduced pressures, before the base-catalyzed polymerization can take place. If such water is not removed, the required iminium ion is not stable and hydrolytic polymerization will take place rather than base-catalyzed polymerization. It is necessary that all water formed by reaction of the catalyst with the lactam, as well as any incidental moisture, be removed prior to addition of the silane, to prevent hydrolysis of the silane to a siloxy compound. Thus, the silane is charged to an anhydrous system.

Other effective catalysts are the organo-metallic derivatives of the foregoing metals as well as of other metals. Examples of such organo-metallic compounds are the lithium, potassium, and sodium alkyls such as butyl lithium, ethyl potassium or propyl sodium, or the aryl compounds of such metals such as sodium phenyl. Other suitable organo-metallic compounds are diphenyl magnesium, zinc diethyl, triisopropyl aluminum, diisobutyl aluminum hydride, etc. As a general class, the materials known as Grignard reagents are effective base catalysts for the present polymerization. Typical of such Grignard catalysts are ethyl magnesium chloride, methyl magnesium bromide, phenyl magnesium bromide, and the like. Other suitable catalysts are sodium amide, magnesium amide and magnesium anilide.

It is taught and claimed in U.S. 3,017,392 that a primary or secondary amine regulator compound can be used to control the molecular weight of polyamides produced from lactams by the base-catalyzed, initiated polymerization system. The present invention teaches that aminosilanes, described above, can be used as the primary or secondary amine of U.S. 3,017,392 to retain the regulatory effect of the amino function and to obtain, in addition, the unexpected enhancement of physical properties due to the functional effect of the silane end groups.

The hydroxyl function of the hydroxy-organosilicon compounds can likewise be employed in a regulator compound, whereby an aminoacid is formed in situ by the reaction of the hydroxy radical with the lactam monomer. Thus an amino group is obtained in a molecule containing an ester linkage binding the silane through a bivalent hydrocarbon intermediate linkage.

It is within the purview of the instant invention to employ an aminosilane or an organosilane containing a hydroxyl group in the polymerization of lactams by base-catalyzed polymerization wherein a diisocyanate is added as an initiator as taught and claimed in U.S. 3,028,369. Use of a diisocyanate initiator permits the formation of linear polyamides having silane groups at each end of the polymer chain. The advantages of having silane end groups on the polyamide chains are illustrated in greater detail herein below.

The polyamides of the instant invention are stabilized during the polymerization of the lactam monomer by the silane end groups attached to the polymer chains. In the conventional base-catalyzed polymerization of lactams, there is a tendency for the growing end of the polymer chain to react with an amino group at the opposite end of the chain to form cyclic polymer chains. The addition of catalytic quantities of an amino oxysilane to the monomer-catalyst system insures production of more uniform linear polymer substantially free of cyclic polyamides. It will be understood, of course, that adjustments of the catalyst-initiator system can be made so as to prepare cross-linked polymer, if desired, by incorporation of suitable quantities of a difunctional initiator such as a diisocyanate along with the oxysilane to the catalyst system.

Within the scope of the instant invention, it is intended to add a difunctional organosilicon compound to the lactam polymerization systems described in U.S. Patents 3,017,391, 3,017,392, 3,018,273 and 3,028,369 incorporated herein by reference.

When the base-catalyzed polymerization of lactams is initiated or promoted by an isocyanate, as taught and claimed in U.S. 3,028,369, a growing polymer chain proceeds from each site provided by the —NCO group. Thus a simple calculation can be made to provide a predetermined percentage of silane end groups. If it is desired to have a silane end group on each polymer chain, the molar concentration of difunctional organosilicon compound will be equivalent to the molar concentration of isocyanate. The molar concentration of oxysilane or halosilane should not exceed the molar concentration of isocyanate. If it is desired to terminate 50%, 70%, or 90% of the polymer chains with silane groups, the initial charge should contain, respectively, 50 mole percent, 70 mole percent, or 90 mole percent silane based on the isocyanate charge.

Thus if it is desired to place one silane end group on part or essentially all of the polymer chains a lesser proportion of organosilicon compound is charged to the polymerization system than in the instance where terminal silane groups are desired at both ends of the polyamide chains. The introduction of terminal silane end groups is based on the ratio of the charge of silane to polymerization initiator, and should not exceed, on a molar basis, the mole equivalent of initiator.

It is understood that, if a monofunctional initiator compound, i.e., monoisocyanate, is employed, a maximum of one silane end group can be obtained on a polymer chain.

If the initiator or promoter is a diisocyanate, the ultimate polymer chain will contain the diisocyanate root, as a substituted urea, within the chain since the chain grows in two directions from the initiator. In this case we can charge up to 2.0 moles of a difunctional organosilicon compound, i.e., an amino oxysilane, per one mole of diisocyanate (2 molar equivalents of —NCO). Therefore, when we wish to terminate each polymer chain end with a silane group, we charge 2.0 moles amino oxysilane per one mole diisocyanate.

Generally we prefer to employ from about 0.1 to about 5 mole percent of an organic isocyanate as an initiator, based on the lactam being polymerized. If the initiator is a monoisocyanate, we can employ from 0.1 to 100 mole percent, preferably from about 10 to 100 mole percent of an amino oxysilane, based on the charge of monoisocyanate charged. When the initiator is a diisocyanate, we can employ from about 0.2 to 200 mole percent, preferably from about 20 to 200 mole percent of an amino oxysilane, based on the charge of the diisocyanate.

When the organosilicon compound contains an isocyanate group as its second functional group, it is not necessary to employ an added isocyanate as an initiator, since the molecule providing the silane function can also act as the polymerization initiator.

It is possible to employ other polymerization initiators, as taught in the U.S. patents cited above, for example, N-carbonyl lactams such as N-acetyl caprolactam, or tertiary amino compounds of the general formula

where A and B are acyl radicals and R can be an acyl radical, a hydrocarbyl radical or a heterocyclic radical. The mole ratio of amino oxysilane to mono-functional initiator should be within the range of from about 1:100 to 1:1 and from about 2:100 to 2:1 for a di-functional initiator.

Among the polymerization initiators that can be employed in the polymerization system to prepare polyamides containing silane end groups, are included, for example, lactam-nitrogen-heterocyclic condensates having the nitrogen atom of the lactam ring connected, through an odd number of conjugated carbon atoms, to the heterocyclic nitrogen atom, e.g., N-(2-pyridyl)-ε-caprolactam; N-(4-pyridyl)ε-caprolactam; tris-N-(2,4,6-triazino)-ε-caprolactam; and N-(2-pyrazinyl)-ε-caprolactam. These promoters can be formed by the in situ reaction of a lactam with such compounds as 2-chloropyridine, 4-bromopyridine, 2-bromopyrazine, 2-methoxypyridine, 2-methoxypyrazine, 2,4,6-trichloro-s-triazine, 2-bromo-4,6-dichloro-s-triazine, and 2,4-dimethoxy-6-chloro-s-triazine.

In the preparation of the novel polymers of the present invention we prefer to operate in an essentially anhydrous system to avoid hydrolysis of the silane. The polymerization takes place readily and rapidly at temperatures as low as 100° C. It will also take place at much higher temperatures, including the conventional lactam polymerization temperatures (230°–250° C.). However, at initiating temperatures much in excess of 190° C. or 200° C., the benefits of reproducibility, control, etc., tend to be less marked. Consequently, preferred polymerization initiating temperatures are those between about 140° C. and about 180° C. At these temperatures, the bulk of the polymerization reaction (e.g., 90% or higher conversion of monomer to polymer) is generally completed within a few minutes. However, it is often desirable to allow the mass to remain at the polymerization temperature for longer periods of time (e.g., up to several hours) in order to achieve maximum conversion (e.g., 99+%).

In order to minimize discoloration of the polymer product, it will generally be desirable to carry out the polymerization under an inert atmosphere (e.g., nitrogen), or to otherwise exclude oxygen from contact with the lactam monomer, catalyst, etc., at the higher temperatures.

In order to illustrate some of the various aspects of the invention and to serve as a guide in applying the invention, the following specific examples are given. It will be understood that variations from the particular temperatures, reactants, and proportion can be made without departing from the invention.

*Example 1*

A thoroughly dried glass reaction vessel, fitted with a gas dispersion tube, was charged with 40.0 g. caprolactam, 0.354 mole. This material was melted in an atmosphere of dry nitrogen and maintained at 80–90° C. while the remaining reactants were added. To the reactor was then added 0.7 ml. aminopropyltriethoxysilane (a quantity calculated to modify about 91% of the polymer chains), 0.16 g., 0.00354 mole, sodium hydride, added as a 53% dispersion in mineral oil, and 0.38 ml., 0.42 g., 0.00354 mole, phenyl isocyanate. The reactants were mixed by ebullition, using a stream of dry nitrogen through the gas disperser, as the temperature was raised to 160° C. Within 15 minutes at 160° C., the product had gelled. The product polymer was held at 160° C., for an additional period of 1.75 hrs. and was then cooled to room temperature.

The polyamide containing ethoxysilane end groups was soluble in formic acid and in m-chlorophenol. A 10% solution of this product in formic acid was used to cast a film on a glass plate, and the film was heated at 110° C. for 5 minutes. This film adhered tenaciously to the glass and was not loosened by hot water. The bonds of the film to glass further withstood immersion in a boiling water bath for 75 minutes without any weakening.

The polycaprolactam prepared in this example had a molecular weight of about 11,000 and about 90% of the polymer chains contained a triethoxysilane end group.

Example 2

A control polymer was prepared following the same procedure of Example 1 with the exception that aminopropyltriethoxysilane was omitted from the charge to the reactor. Film was cast from a 10% solution of the polymer in formic acid onto a glass plate and heated to 110° C. for 5 minutes as above. This film was removed from the glass by a stream of hot water within a few seconds.

Example 3

To a sample of the formic acid solution containing 10% of the control polycaprolactam of Example 2 was added a quantity of aminopropyltriethoxysilane to obtain the same weight relationship of alkoxysilane to caprolactam as was initially charged to the polymerization reactor in Example 1. The solution was aged for several hours at room temperature and a film of polymer then cast onto a clean glass plate from this solution. The film was heated to 110° for 5 minutes. There was no improvement in adherency of the film to glass over the control polymer of Example 2.

Examples 1, 2 and 3 demonstrate that polycaprolactam, having this surprising property of strong adherence to glass, is obtained only when the alkoxysilane is chemically bound to the polylactam polymer chains.

Example 4

A polymerization reaction vessel, as described in Example 1, was charged with 40.0 g., 0.354 mole, caprolactam, 1.30 ml., 1.24 g., 0.006 mole, aminopropyltriethoxysilane, 0.16 g., 0.00354 mole sodium hydride added as a 53% dispersion in mineral oil, and 0.505 ml., 0.616 g., 0.00354 mole toluene diisocyanate. The quantity of alkoxysilane charged is calculated to obtain about 85% of the polycaprolactam chains having alkoxysilane end groups at each end of the polymer chain. Polymerization proceeded rapidly and was considered complete after a total reaction period of 1 hour at 160° C. in a dry nitrogen atmosphere.

Some gelled particles were visible when this polymer was dissolved in m-chlorophenol, sulfuric acid, or formic acid indicating that some crosslinked polymer was obtained. Film cast onto a glass plate, or onto glass fibers, from a filtered solution exhibited the tenacious adherence to glass exhibited by the polycaprolactam of Example 1. It was observed that heat treatment was not necessary to bind the polymer to glass, although the heating step accelerated the desired result. Thus, a permanent bond of the polymer to glass could readily be obtained by heating the film and glass substrate for 5 minutes at 110° C., but an equally strong bond was obtained by permitting the film and glass to age overnight at room temperature without application of external pressure.

Example 5

The procedure of Example 1 was followed with the exception that 0.8 g. methoxycarbonylisopropyltrichlorosilane, $CH_3OCOCH(CH_3)CH_2SiCl_3$, was charged to the reactor in place of the aminopropyltriethoxysilane. A film of the product polymer, cast from formic acid onto a glass plate, adhered to the glass and the bond was not weakened by boiling water.

Example 6

A series of polymers was prepared to determine whether adherence to glass could be used as a qualitative indication of bonding of the difunctional organosilicon compound to the polymer chain. The general procedure of Example 1 was followed with the following compounds charged as substitutes for the aminopropyltriethoxysilane:

(A) Hydroxybutyltriethoxysilane
(B) N-methylcarbamoylpropyltrimethoxysilane
(C) 3-isocyanatopropyltrimethoxysilane It was noted that each of the product polymers adhered to glass, and the polymer-to-glass bond was not weakened by boiling water.

By the practice of the instant invention it is now possible to prepare polyamides that can be bonded to glass surfaces with bonds that withstand severe conditions such as resisting boiling water for extended periods. Thus a clear polyamide containing oxysilane or halosilane end groups can be employed as an interlayer to provide strong safety glass of the sandwich type. Clear films of polyamides containing silane end groups can be prepared by the addition of salts, such as lithium salts to the polymer. It is believed that these additives disrupt the crystallinity of the polymer giving greater transparency. In another application of the invention polyamide films containing silane end groups can be securely bonded to television picture tubes and also to television safety masks to provide implosion protection. The film can likewise be bonded to flash bulbs used for photographic purposes, and to laboratory glassware used in vacuum, or pressure, reactions to prevent injury in case of breakage. These modified polyamides can also be used to provide a sizing or plastic coating for glass fibers useful in fiber glass filters, cloth, etc.

Additionally, the modified polyamides containing oxysilane or halosilane end groups can be processed to fibers by the conventional melt spinning or solvent spinning process. These fibers can then be crosslinked after spinning to provide dimensional stability to the fibers. Alternately these fibers or filaments can be incorporated into other polymer compositions to provide improved physical properties due to the chemical bonding of the polyamide to the "parent" composition through the silane end groups.

The polyamides containing oxysilane or halosilane end groups can be bonded to substances other than glass. It has been postulated that hydrolysis of the silane groups permits the attachment of the polyamide to a silicon atom of the glass through a —Si—O—Si— linkage. Materials, other than glass, which have —OH groups at their surface, similary attach the modified polyamides through a $$-O-Si-$$

bond wherein the silicon bond is derived from the silane end groups. Thus, the polyamides containing silane end groups can be bonded to cellulosic materials, alkaline-pretreated metals, and various siliceous materials.

Numerous examples of suitable difunctional organosilicon compounds that can participate in the base-catalyzed polymerization of lactams have been described. The preferred silane functional group can be characterized as

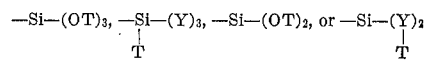

wherein T is an alkyl radical of 1 to 8 carbon atoms, and Y is chlorine, bromine, or iodine. The silane group is connected to the other functional group in the molecule through a bivalent hydrocarbon group, —Z—, which can be an alkylene radical of 2 to 9 carbon atoms and preferably from 3 to 6 carbon atoms or a phenylene radical. The second functional group in the molecule, can be

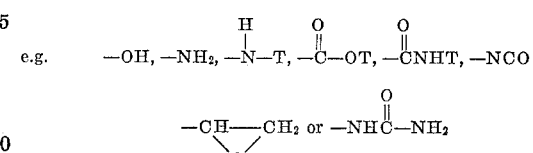

wherein T is an alkyl radical of 1 to 8 carbon atoms.

The polyamides of this invention are prepared with silane end groups wherein the groups attached to the silicon atom are readily hydrolizable to hydroxyls, thus the end groups can be either

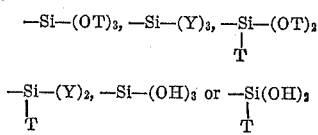

all of these being referred to as silane groups.

While the invention has been described with particular reference to preferred embodiments thereof, it will be appreciated that variations from the details given herein can be effected without departing from the invention in its broadest aspects.

We claim:

1. Polycaprolactam prepared by a base-catalyzed substantially anhydrous anionic polymerization of caprolactam conducted in the presence of an organosilicon compound containing
   (A) a silane radical selected from the group consisting of

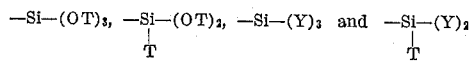

wherein T is an alkyl radical of 1 to 8 carbon atoms and Y is selected from the group consisting of chlorine, bromine and iodine, and
   (B) a functional group selected from the group consisting of

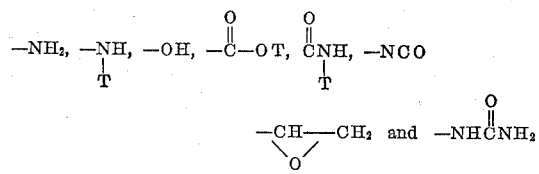

wherein T is an alkyl radical of 1 to 8 carbon atoms, and
   (C) a bivalent hydrocarbon group, —Z—, connecting (A) and (B), wherein —Z— is selected from the group consisting of alkylene radicals of 2 to 9 carbon atoms and phenylene radicals, said organosilicon compound formed by groups A, B and C above being present in sufficient quantity to provide a polycaprolactam having silane end groups, which polycaprolactam is capable of adhering to glass with a force that withstands the dissolution effect of boiling water for 75 minutes.

2. A polyamide obtained by a base-catalyzed, substantially anhydrous anionic polymerization of a lactam of the formula

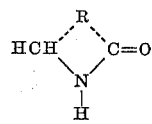

wherein R is a divalent alkylene bridge group, of 1 to 13 carbon atoms, necessary to complete the heterocyclic ring system conducted in the presence of from about 0.001 to about 1 mole equivalent per mole equivalent of polymerization initiator of an organo silicon compound containing
   (A) a silane radical selected from the group consisting of

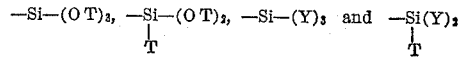

wherein T is an alkyl radical of 1 to 8 carbon atoms and Y is selected from the group consisting of chlorine, bromine, and iodine, and
   (B) a functional group selected from the group consisting of

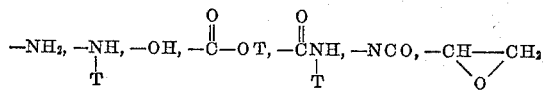

and

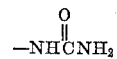

wherein T is an alkyl radical of 1 to 8 carbon atoms, and
   (C) a bivalent hydrocarbon group, —Z—, connecting (A) and (B), wherein —Z— is selected from the group consisting of alkylene radicals of 2 to 9 carbon atoms and phenylene radicals.

3. A polyamide according to claim 2 wherein said organosilicon compound has the formula

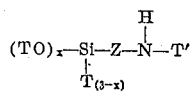

wherein

T is an alkyl radical of 1 to 8 carbon atoms,
   x is an integer from 2 to 3,
   T' is selected from the group consisting of hydrogen and alkyl radicals of 1 to 8 carbon atoms, and
   Z is a bivalent hydrocarbon radical selected from the group consisting of alkylene radicals of 3 to 6 carbon atoms and phenylene radicals.

4. The polyamide of claim 3 wherein said organosilicon compound is aminopropyltrialkoxysilane.

5. A polyamide according to claim 2 wherein said organosilicon compound has the formula

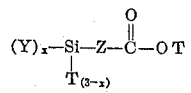

wherein Y is a halogen selected from the group consisting of chlorine, bromine, and iodine, or an alkoxy group having up to 8 carbon atoms,
   x is an integer from 2 to 3,
   T is an alkyl radical of 1 to 8 carbon atoms, and
   Z is a bivalent hydrocarbon radical selected from the group consisting of alkylene radicals of 3 to 6 carbon atoms and phenylene radicals.

6. In the base-catalyzed substantially anhydrous anionic polymerization of lactams of the formula

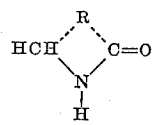

wherein R is a divalent alkylene bridge group, of 1 to 13 carbon atoms, necessary to complete the heterocyclic ring system, wherein a mono-functional initiator is employed, the improvement which comprises carrying out the polymerization in the presence of between about 0.1 mole percent and about 100 mole percent based on said initiator, of a difunctional organosilicon compound characterized by
   (A) a silane radical selected from the group consisting of

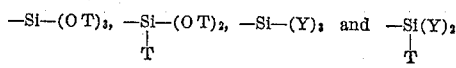

wherein T is an alkyl radical of 1 to 8 carbon atoms and Y is selected from the group consisting of chlorine, bromine, and iodine, and (B) a functional group selected from the group consisting of

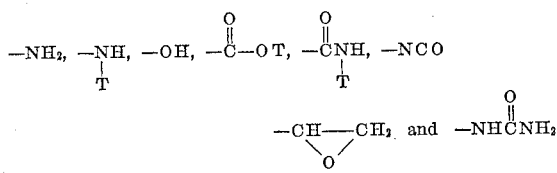

wherein T is an alkyl radical of 1 to 8 carbon atoms, and (C) a bivalent hydrocarbon group, —Z—, connecting A. and B., wherein —Z— is selected from the group consisting of alkylene radicals of 3 to 6 carbon atoms and phenylene radicals.

7. In the base-catalyzed substantially anhydrous anionic polymerization of lactams of the formula

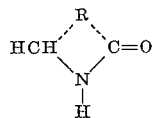

wherein R is a divalent alkylene bridge group, of 1 to 13 carbon atoms, necessary to complete the heterocyclic ring system, conducted in the presence of a polymerization initiator, the improvement which comprises the addition of a small but significant quantity of an amino oxysilane, not exceeding the molar equivalents of initiator functional groups, to prepare a polyamide terminated by silane groups, said polyamide being capable of adhering to glass with a force that withstands the dissolution effect of boiling water for 75 minutes.

8. In the base-catalyzed substantially anhydrous anionic polymerization of lactams of the formula

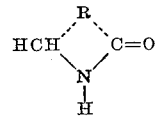

wherein R is a divalent alkylene bridge group, of 1 to 13 carbon atoms, necessary to complete the heterocyclic ring system, conducted in the presence of a di-functional initiator, the improvement which comprises carrying out the polymerization in the presence of between about 0.2 mole percent and about 200 mole percent, based on said initiator, of an oxysilane of the formula

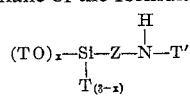

wherein

T is an alkyl radical of 1 to 8 carbon atoms, $x$ is an integer from 2 to 3,

T' is selected from the group consisting of hydrogen and alkyl radicals of 1 to 8 carbon atoms, and Z is a bivalent hydrocarbon radical selected from the group consisting of alkylene radicals of 3 to 6 carbon atoms and phenylene radicals.

9. In the base-catalyzed substantially anhydrous anionic polymerization of lactams conducted in the presence of a mono-functional initiator, the improvement which comprises carrying out the polymerization in the presence of between about 0.1 mole percent and about 100 mole percent, based on said promoter, of an oxysilane of the formula

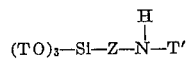

wherein T is an alkyl radical of 1 to 8 carbon atoms, T' is selected from the group consisting of hydrogen and alkyl radicals of 1 to 8 carbon atoms, and Z is a bivalent hydrocarbon radical selected from the group consisting of alkylene radicals of 3 to 6 carbon atoms and phenylene radicals.

10. The process of claim 9 wherein the mono-functional promoter is an organic isocyanate.

11. The process of claim 9 wherein the oxysilane is aminopropyltriethoxysilane.

12. The process for preparing an essentially linear polycaprolactam terminated by silane groups comprising the base-catalyzed polymerization of caprolactam in the presence of a nitrogen-containing initiator and 0.1 mole percent to 200 mole percent, based on said nitrogen-containing initiator of a difunctional organosilicon compound characterized by (A) a silane radical selected from the group consisting of $$-Si(OT)_3, -Si-(OT)_2, -Si-(Y)_3 \text{ and } -Si(Y)_2,$$
  $\quad\quad\quad\quad\ \ \ \ \ T\quad\quad\quad\quad\quad\quad\quad\quad\quad T$ wherein T is an alkyl radical of 1 to 8 carbon atoms and Y is selected from the group consisting of chlorine, bromine, and iodine, and (B) a functional group selected from the group consisting of

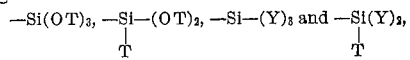

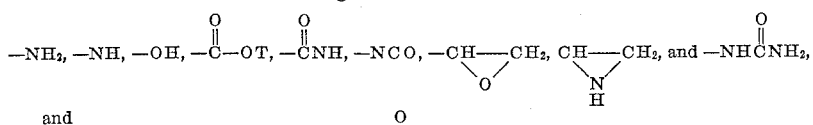

wherein T is an alkyl radical of 1 to 8 carbon atoms, and (C) a bivalent hydrocarbon group, —Z—, connecting A. and B., wherein —Z— is selected from the group consisting of alkylene radicals of 3 to 6 carbon atoms and phenylene radicals.

13. The process of claim 12 wherein said organosilicon compound is aminopropyltrialkoxysilane.

References Cited

UNITED STATES PATENTS

| | | | |
|---|---|---|---|
| 2,823,195 | 2/1958 | Shorr et al. | 260—78 |
| 2,874,139 | 2/1959 | Symons | 260—37 |
| 3,017,391 | 1/1962 | Mottus et al. | 260—78 |
| 3,086,962 | 4/1963 | Mottus et al. | 260—78 |
| 3,180,855 | 4/1965 | Black | 260—78 |

OTHER REFERENCES

Rochow: Chemistry of the Silicones, 2nd ed., 1951, pp. 9, 24, 56–57 and 75, John Wiley & Sons, Inc., N.Y.

WILLIAM H. SHORT, *Primary Examiner.*

LOUISE P. QUAST, *Examiner.*

H. D. ANDERSON, *Assistant Examiner.*